United States Patent
Brostrom et al.

(10) Patent No.: US 10,094,382 B2
(45) Date of Patent: Oct. 9, 2018

(54) COMPRESSOR HAVING OIL-LEVEL SENSING SYSTEM

(71) Applicant: Emerson Climate Technologies, Inc., Sidney, OH (US)

(72) Inventors: Troy Richard Brostrom, Lima, OH (US); Pavankumar Pralhad Jorwekar, Ahmednagar (IN); Prashant Ramesh Jagdale, Pune (IN); Vinayak Madanrao Juge, Pune (IN); Pankaj Ahire, Pune (IN)

(73) Assignee: Emerson Climate Technologies, Inc., Sidney, OH (US)

( * ) Notice: Subject to any disclaimer, the term of this patent is extended or adjusted under 35 U.S.C. 154(b) by 0 days.

(21) Appl. No.: 15/130,493

(22) Filed: Apr. 15, 2016

(65) Prior Publication Data
US 2016/0319816 A1   Nov. 3, 2016

(30) Foreign Application Priority Data

Apr. 29, 2015   (IN) .......................... 1706/MUM/2015

(51) Int. Cl.
*F04C 28/28*    (2006.01)
*F04C 29/02*    (2006.01)
(Continued)

(52) U.S. Cl.
CPC .......... *F04C 28/28* (2013.01); *F04B 39/0207* (2013.01); *F04B 39/0284* (2013.01);
(Continued)

(58) Field of Classification Search
CPC ............ F04B 39/023; F04B 2201/0402; F04C 29/021; G01F 23/247
See application file for complete search history.

(56) References Cited

U.S. PATENT DOCUMENTS 3,570,311 A    3/1971 Nelson
3,701,138 A    10/1972 Pulliam et al.
(Continued)

FOREIGN PATENT DOCUMENTS

CN    1058455 A    2/1992
CN    102182671 A    9/2011
(Continued)

OTHER PUBLICATIONS

International Search Report and Written Opinion of the International Searching Authority regarding Application No. PCT/US2014/053200, dated Nov. 24, 2014.
(Continued)

*Primary Examiner* — David A Rogers
(74) *Attorney, Agent, or Firm* — Harness, Dickey & Pierce, P.L.C.

(57) ABSTRACT

A compressor includes a shell, a first temperature sensor, a second temperature sensor, and a control module. The shell includes a motor, a compression mechanism and a lubricant sump. The first temperature sensor is at least partially disposed within the shell and configured to measure a first temperature of a lubricant at a first position. The second temperature sensor is at least partially disposed within the shell and configured to measure a second temperature of the lubricant at a second position that is vertically higher than the first position. The control module is in communication with the first and second temperature sensors and configured to determine a first difference between the first temperature and the second temperature. The control module is configured to determine whether a liquid level of the lubricant in the lubricant sump is below a predetermined level based on the first difference.

19 Claims, 7 Drawing Sheets

(51) Int. Cl.
|  |  |
|---|---|
| *F04C 18/02* | (2006.01) |
| *F04B 39/02* | (2006.01) |
| *F04B 49/10* | (2006.01) |
| *F04C 18/16* | (2006.01) |
| *F04C 18/34* | (2006.01) |
| *G01F 23/24* | (2006.01) |
| *F25B 31/00* | (2006.01) |
| *G01F 23/00* | (2006.01) |

(52) U.S. Cl.
CPC .......... *F04B 49/10* (2013.01); *F04C 18/0215* (2013.01); *F04C 18/16* (2013.01); *F04C 18/34* (2013.01); *F04C 29/02* (2013.01); *G01F 23/246* (2013.01); *F04C 2240/809* (2013.01); *F04C 2240/81* (2013.01); *F04C 2270/19* (2013.01); *F04C 2270/22* (2013.01); *F04C 2270/24* (2013.01); *F04C 2270/86* (2013.01); *F25B 31/002* (2013.01); *F25B 2700/03* (2013.01); *F25B 2700/21155* (2013.01); *G01F 23/0007* (2013.01)

(56) References Cited

U.S. PATENT DOCUMENTS

| | | | |
|---|---|---|---|
| 3,744,267 | A | 7/1973 | Norbeck |
| 4,135,186 | A | 1/1979 | Minorikawa et al. |
| 4,490,988 | A | 1/1985 | Vogel et al. |
| 4,630,477 | A | 12/1986 | Murtland, Jr. |
| 4,720,997 | A | 1/1988 | Doak et al. |
| 5,001,596 | A | 3/1991 | Hart |
| 5,103,368 | A | 4/1992 | Hart |
| 5,370,513 | A * | 12/1994 | Fain ............... F04C 18/0215 418/151 |
| 5,620,310 | A | 4/1997 | Takenaka et al. |
| 5,719,332 | A | 2/1998 | Wallrafen |
| 5,839,886 | A * | 11/1998 | Shaw ............... F04B 39/0207 417/250 |
| 6,276,901 | B1 | 8/2001 | Farr et al. |
| 6,546,796 | B2 | 4/2003 | Zimmermann et al. |
| 6,862,932 | B2 | 3/2005 | Zimmermann et al. |
| 6,886,354 | B2 | 5/2005 | Dudley |
| 6,973,828 | B2 | 12/2005 | Zimmermann et al. |
| 7,540,718 | B2 | 6/2009 | Funami et al. |
| 7,568,894 | B2 | 8/2009 | Uratani |
| 7,596,998 | B2 | 10/2009 | Zimmermann et al. |
| 7,874,724 | B2 | 1/2011 | Okoren et al. |
| 8,021,125 | B2 | 9/2011 | Uratani |
| 8,177,521 | B2 | 5/2012 | Chen et al. |
| 9,341,187 | B2 | 5/2016 | Brostrom et al. |
| 9,784,274 | B2 | 10/2017 | Brostrom et al. |
| 2002/0102163 | A1* | 8/2002 | Dudley ............ F04C 23/008 417/53 |
| 2003/0046997 | A1* | 3/2003 | Waller ............ F25B 31/002 73/295 |
| 2004/0166008 | A1 | 8/2004 | Lai et al. |
| 2005/0226735 | A1 | 10/2005 | Funami et al. |
| 2005/0254977 | A1 | 11/2005 | Aya et al. |
| 2006/0013697 | A1 | 1/2006 | Uratani |
| 2008/0008604 | A1 | 1/2008 | Tolbert |
| 2008/0250798 | A1 | 10/2008 | Okoren et al. |
| 2009/0101725 | A1 | 4/2009 | Dolan et al. |
| 2011/0085925 | A1* | 4/2011 | Fan ............... F04C 18/0215 417/321 |
| 2011/0156918 | A1 | 6/2011 | Santos |
| 2011/0211973 | A1* | 9/2011 | Lee ............... F04C 23/008 417/13 |
| 2011/0239672 | A1* | 10/2011 | Won ............... F04B 39/0207 62/193 |
| 2011/0253093 | A1 | 10/2011 | Namba |
| 2011/0264409 | A1 | 10/2011 | Jayanth et al. |
| 2012/0132305 | A1 | 5/2012 | Conley |
| 2013/0098100 | A1* | 4/2013 | Bonnefoi ........... F25B 31/002 62/468 |
| 2014/0072467 | A1 | 3/2014 | Wang et al. |
| 2015/0064040 | A1 | 3/2015 | Brostrom et al. |
| 2016/0252092 | A1 | 9/2016 | Kulkarni et al. |
| 2017/0089340 | A1 | 3/2017 | Brostrom et al. |

FOREIGN PATENT DOCUMENTS

| | | |
|---|---|---|
| CN | 102679507 A | 9/2012 |
| DE | 102004035855 A1 | 2/2005 |
| EP | 2578880 A1 | 4/2013 |
| JP | 2001012351 A | 1/2001 |
| JP | 2001-032772 A | 2/2001 |
| JP | 2002317785 A | 10/2002 |
| JP | 2003097443 A | 4/2003 |
| JP | 2006029160 A | 2/2006 |
| WO | WO-2015031639 A1 | 3/2015 |

OTHER PUBLICATIONS

Restriction Requirement regarding U.S. Appl. No. 14/470,234, dated Sep. 28, 2015.
Office Action regarding U.S. Appl. No. 14/470,234, dated Dec. 11, 2015.
International Search Report regarding International Application No. PCT/US2016/029568, dated Aug. 10, 2016.
Written Opinion of the International Searching Authority regarding International Application No. PCT/US2016/029568, dated Aug. 10, 2016.
Office Action regarding Chinese Patent Application No. 201480046756.8, dated Oct. 31, 2016. Translation provided by Unitalen Attorneys at Law.
Restriction Requirement regarding U.S. Appl. No. 15/153,922, dated Dec. 14, 2016.
Office Action regarding U.S. Appl. No. 15/153,922, dated Mar. 15, 2017.
Office Action regarding U.S. Appl. No. 15/151,884, dated Mar. 21, 2017.
Search Report regarding European Patent Application No. 14839404.2, dated Mar. 24, 2017.
Office Action regarding U.S. Appl. No. 15/151,884, dated Sep. 1, 2017.
Advisory Action regarding U.S. Appl. No. 15/151,884, dated Nov. 9, 2017.
Office Action regarding U.S. Appl. No. 15/151,884, dated Dec. 19, 2017.
Notice of Allowance regarding U.S. Appl. No. 15/151,884, dated May 30, 2018.
Non-Final Office Action regarding U.S. Appl. No. 15/376,742, dated Jun. 1, 2018.

* cited by examiner

COMPRESSOR HAVING OIL-LEVEL SENSING SYSTEM

CROSS-REFERENCE TO RELATED APPLICATIONS

This application claims the benefit of Indian Patent Application No. 1706MUM2015, filed on Apr. 29, 2015. The entire disclosure of the application referenced above is incorporated herein by reference.

FIELD

The present disclosure relates to a compressor assembly having an oil-level sensing system.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and one or more compressors circulating a working fluid (e.g., refrigerant or carbon dioxide) between the indoor and outdoor heat exchangers. Efficient and reliable operation of the one or more compressors is desirable to ensure that the climate-control system in which the one or more compressors are installed is capable of effectively and efficiently providing a cooling and/or heating effect on demand.

Effective and efficient operation of a compressor often requires lubricating certain moving components within the compressor. Accordingly, often a compressor will include a lubricant sump or reservoir and lubrication monitoring system, such as a gauge and/or sensor, to monitor the level or quantity of lubricant in the lubricant reservoir. While known lubrication monitoring systems have proven acceptable for their intended purpose, a continuous need for improvement in the relevant art remains. In this regard, it may be desirable to provide a compressor having a lubricant-level sensing system that can more effectively and accurately monitor the quantity of lubricant within the compressor.

SUMMARY

This section provides a general summary of the disclosure, and is not a comprehensive disclosure of its full scope or all of its features.

In one form, a compressor is provided. The compressor may include a shell, a first temperature sensor, a second temperature sensor, and a control module. The shell may include a motor, a compression mechanism and a lubricant sump. The first temperature sensor may be at least partially disposed within the shell and configured to measure a first temperature of a lubricant at a first position. The second temperature sensor may be at least partially disposed within the shell and configured to measure a second temperature of the lubricant at a second position that is vertically higher than the first position. The control module may be in communication with the first and second temperature sensors and configured to determine a first difference between the first temperature and the second temperature. The control module may be configured to determine whether a liquid level of the lubricant in the lubricant sump is below a predetermined level based on the first difference.

In some configurations, a vertical height of the second position is equal to a vertical height of the predetermined level.

In some configurations, the predetermined level equals a minimum acceptable vertical height of said lubricant.

In some configurations, the compressor includes a third temperature sensor at least partially disposed within the shell and configured to measure a temperature of the working fluid at a third position that is vertically higher than the first and second positions. The control module may be configured to determine a second difference between the second temperature of the lubricant and the temperature of the working fluid at the third temperature sensor. The control module may be configured to determine whether the vertical height of the lubricant is below the second position based on the second difference.

In some configurations, the shell defines a suction chamber containing the working fluid that is drawn into the compression mechanism for compression during operation of the compressor. The third temperature sensor may be disposed within the suction chamber.

In some configurations, the compressor includes a pressure sensor disposed at least partially within the shell vertically above the predetermined level. The control module may determine whether the liquid level is below the predetermined level based on data from the pressure sensor.

In some configurations, the compressor includes a pressure sensor disposed at least partially within the shell. The control module may determine whether the liquid level is below the predetermined level based on whether data from the pressure sensor indicates a presence of liquid working fluid in the shell.

In some configurations, the control module determines whether the liquid level is below the predetermined level based on whether the compressor is on or off.

In some configurations, the compressor includes a heating element configured to heat liquid within the lubricant sump. The control module may determine whether the liquid level is below the predetermined level based on whether the heating element is functioning.

In another form, a compressor is provided. The compressor may include a shell, a suction inlet, a fluid path, a first temperature sensor, a second temperature sensor, and a control module. The shell may include a motor, a compression mechanism, a lubricant sump, and a suction chamber. The suction inlet may extend through the shell and be configured to deliver suction gas to the suction chamber. The fluid path may be configured to deliver suction gas. The fluid path may include a first end terminating proximate the lubricant sump and a second end terminating proximate the suction inlet. The first temperature sensor may be disposed within the fluid path adjacent the first end. The second temperature sensor may be disposed within the shell at a position vertically higher than the first sensor. The control module may be in communication with the first and second temperature sensors. The control module may determine a temperature difference between the first temperature sensor and the second temperature sensor. The control module may determine a liquid level in the lubricant sump based on the temperature difference.

In some configurations, the compressor includes a baffle. The fluid path may be at least partially defined by the baffle and the shell.

In some configurations, the first temperature sensor is at least partially disposed between the baffle and the shell.

In some configurations, the second temperature sensor is disposed vertically higher than the second end.

In some configurations, the fluid path is disposed externally to the shell.

In some configurations, the working fluid is drawn into the compression mechanism for compression therein during operation of the compressor. The second temperature sensor may be disposed within the suction chamber and measure a temperature of the working fluid disposed within the suction chamber.

In some configurations, the liquid level is below the predetermined level when the liquid level is vertically below the first temperature sensor.

In some configurations, the first temperature sensor is exposed to a flow of the suction gas in a first mode of operation, and the first temperature sensor is exposed to a lubricant in a second mode of operation.

In yet another form, a method of monitoring a quantity of a lubricant within a compressor is provided. The method may include determining a first temperature from a first temperature sensor at a first location within the compressor. The method may also include determining a second temperature from a second temperature sensor at a second location within the compressor. The method may further include determining a first difference between the first and second temperatures. The method may additionally include determining a third temperature from a third temperature sensor at a third location within the compressor. The method may also include determining a second difference between the second and third temperatures and determining whether a liquid level in a lubricant sump within the compressor is below a predetermined level based on at least one of the first difference and the second difference.

In some configurations, the second location within the compressor is vertically higher than the first location within the compressor.

In some configurations, the method also includes determining a first standard deviation of measurements from one of the first and second temperature sensors. Determining whether the liquid level is below the predetermined level may be based on the first standard deviation.

In some configurations, the method also includes determining a second standard deviation of measurements from the other of the first and second temperature sensors. Determining whether the liquid level is below the predetermined level may be based on the second standard deviation.

In some configurations, the method also includes determining first and second ratios. The first ratio may be a ratio of the difference between the first and second temperature measurements to the first standard deviation. The second ratio may be a ratio of the difference between the first and second temperature measurements to the second standard deviation. Determining whether the liquid level is below the predetermined level may be based on a comparison of the first and second ratios.

In some configurations, the method may also include continuously or intermittently recalculating the first and second ratios, storing values of the first and second ratios, and determining whether the liquid level is falling based on whether the stored values of the first ratio are converging toward the stored values of the second ratio.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1A:
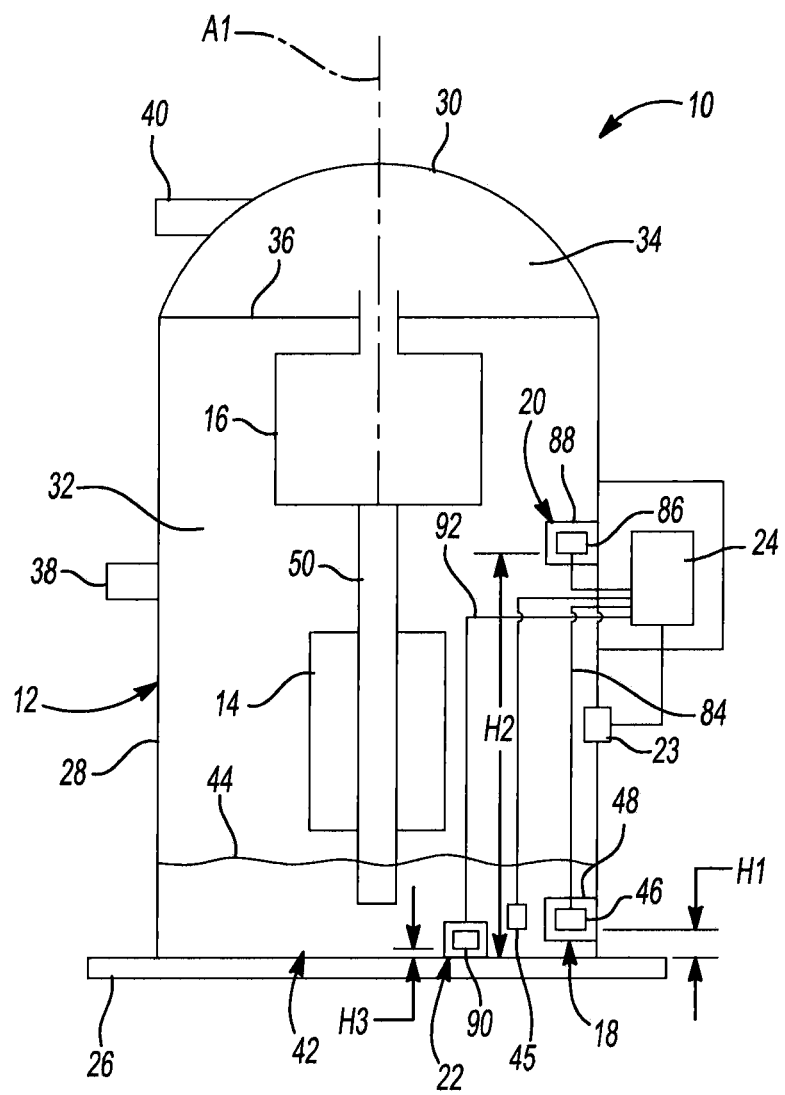
FIG. 1A is a schematic representation of a compressor having a lubricant-level sensing system according to the principles of the present disclosure.

With reference to FIG. 1A, a compressor 10 is provided that may include a shell assembly 12, a motor 14, a compression mechanism 16, a first temperature sensor assembly 18, a second temperature sensor assembly 20, a third temperature sensor assembly 22, a pressure sensor 23, and a control module 24. As will be explained in more detail below, according to the principles of the present disclosure, the compressor 10 is configured to determine a level or quantity of a lubricant in the compressor 10 using at least two of the first, second, and third temperature sensor assemblies 18, 20, 22. In particular, in some configurations, the compressor 10 is configured to determine the level or quantity of lubricant in the compressor 10 using the first, second, and third temperature sensor assemblies 18, 20, 22. In other configurations, the compressor 10 is configured to determine the level or quantity of lubricant in the compressor 10 using the first and third temperature sensor assemblies 18, 22. Accordingly, while the compressor 10 is generally described herein as including first, second, and third temperature sensor assemblies 18, 20, 22, it will be appreciated that in some configurations the compressor 10 may include only two of the first, second, and third temperature sensor assemblies 18, 20, 22.

The shell assembly 12 may include a base 26, a cylindrical shell 28 extending along a longitudinal axis A1, and an end cap 30. The shell 28 and the base 26 may define a suction chamber 32. The end cap 30 may define a discharge chamber 34. A partition 36 may separate the suction chamber 32 from the discharge chamber 34. A suction port or fitting 38 may extend through the shell 28 and communicate with the suction chamber 32. A discharge fitting 40 may extend through the end cap 30 and communicate with the discharge chamber 34.

The base 26 and shell 28 may define a lubricant sump 42 containing a volume of lubricant (e.g., oil or a mixture of oil and refrigerant) at a lubricant level 44. A vertical height of the lubricant level 44 (i.e., the volume of lubricant in the lubricant sump 42) may vary during operation of the compressor 10. A crankcase heater 45 may be disposed in the lubricant sump 42 and may be operable to heat the lubricant within the lubricant sump 42 and/or heat other components of the compressor 10. The control module 24 may be in communication with the crankcase heater 45 and may control operation of the crankcase heater 45 to maintain the lubricant in the lubricant sump 42 at or above a predetermined temperature.

The compression mechanism 16 may be disposed within the shell assembly 12 and may be driven by the motor 14. The compression mechanism 16 may be any type of compression mechanism, such as a scroll, reciprocating, rotary vane or screw type compression mechanism, for example. During operation of the compression mechanism 16, working fluid from the suction chamber 32 may be drawn into the compression mechanism 16 and compressed therein. Compressed working fluid may be discharged from the compression mechanism 16 into the discharge chamber 34 before exiting the compressor 10 though the discharge fitting 40.

The first temperature sensor assembly 18 may include a first temperature sensor 46 and a first casing or slosh guard 48. A further discussion of the first temperature sensor assembly 18, including various configurations and functions of the first temperature sensor 46 and the first slosh guard 48, may be found in commonly-owned U.S. patent application Ser. No. 14/470,234 filed on Aug. 27, 2014 and entitled "Compressor Assembly with Liquid Sensor", which is hereby incorporated by reference in its entirety.

The first temperature sensor assembly 18 may be mounted to any suitable structure to fix the first temperature sensor assembly 18, including the first temperature sensor 46, relative to the shell assembly 12 in a position so that the first temperature sensor 46 is disposed at a first vertical height H1 above the base 26 of the shell assembly 12. For example, the first temperature sensor assembly 18 could be mounted to a lower bearing housing (not shown) that rotatably supports a crankshaft 50 driven by the motor 14 or the first temperature sensor assembly 18 could be mounted to the shell 28. The first vertical height H1 may be a predetermined vertical height that corresponds to a first predetermined lubricant level in the lubricant sump 42 (e.g., a height of the lubricant level 44 when a predetermined adequate, or minimum acceptable, level of lubricant is present in the lubricant sump 42).

In some embodiments, wires 84 electrically connected to the first temperature sensor 46 may be disposed within a wire harness (not shown) that is attached to or disposed within a stator of the motor 14. The wires 84 may extend from the stator to a sealed terminal plug assembly (not shown) in electrical communication with the control module 24.

The first temperature sensor 46 may be in communication with the control module 24 and may be or include a thermocouple, a PTC (positive temperature coefficient) thermistor, an NTC (negative temperature coefficient) thermistor and/or a heat pulse sensor, for example, and/or any other temperature-sensing device. As will be subsequently described, the control module 24 may be operable to determine whether the lubricant level 44 in the lubricant sump 42 is below the first vertical height H1 based on data received from the first temperature sensor 46.

Referring again to FIG. 1A, the second temperature sensor assembly 20 may include a second temperature sensor 86 and a second casing or slosh guard 88. The second temperature sensor 86 may be disposed within the second slosh guard 88 and may be operable to measure a temperature of fluid (gas and/or liquid) to which the second temperature sensor 86 is exposed. A further discussion of the second temperature sensor assembly 20, including various configurations and functions of the second temperature sensor 86 and the second slosh guard 88, may be found in commonly-owned U.S. patent application Ser. No. 14/470, 234, which is hereby incorporated by reference in its entirety.

The second temperature sensor assembly 20 may be mounted to any suitable structure to fix the second temperature sensor assembly 20 relative to the shell assembly 12 in a position so that the second temperature sensor 86 is disposed at a second vertical height H2 above the base 26 of the shell assembly 12. For example, the second temperature sensor assembly 20 could be mounted to an upper bearing housing (not shown) that rotatably supports the crankshaft 50 or the second temperature sensor assembly 20 could be mounted to the shell 28 or to an oil drain tube connected to the upper bearing housing. The second vertical height H2 is vertically higher than the first vertical height H1 and may be higher than a predetermined maximum expected lubricant level in the lubricant sump 42. That is, the second vertical height H2 may be at or above a height of the lubricant level 44 associated with a lubricant-overfill or a lubricant-flood condition, for example.

The second temperature sensor 86 may be in communication with the control module 24 and may be or include a thermocouple, a PTC (positive temperature coefficient) thermistor, an NTC (negative temperature coefficient) thermistor and/or a heat pulse sensor, for example, and/or any other temperature-sensing device. As will be subsequently described, the control module 24 may be operable to determine whether the lubricant level 44 in the lubricant sump 42 is below the first vertical height H1 based on data received from the second temperature sensor 86.

While the first and second temperature sensor assemblies 18, 20 are described above as including the first and second slosh guards 48, 88, respectively, it will be appreciated that, in some embodiments, only one of the temperature sensor assemblies 18, 20 may include a slosh guard or neither of the temperature sensor assemblies 18, 20 may include a slosh guard. For example, in some configurations the first and/or second temperature sensors 46, 86 may be disposed directly within, and/or attached directly to, the shell 28, without the slosh guards 48, 88.

The third temperature sensor assembly 22 may include a third temperature sensor 90. The third temperature sensor assembly 22 may be mounted to any suitable structure to fix the third temperature sensor assembly 22 relative to the shell assembly 12 in a position so that the third temperature sensor 90 is disposed at a third vertical height H3 above the base 26 of the shell assembly 12. In some configurations, the third temperature sensor assembly 22 may be mounted to the base 26 such that the third vertical height H3 is equal to zero. Accordingly, it will be appreciated that the third vertical height H3 is vertically lower than the first vertical height H1, and may be lower than the first predetermined lubricant level in the lubricant sump 42. That is, the third vertical height H3 may be less than the height of the lubricant level 44 associated with a minimum acceptable level of lubricant, for example.

In some embodiments, wires 92 electrically connected to the third temperature sensor 90 may be disposed within a wire harness (not shown) that is attached to or disposed within the stator of the motor 14. The wires 92 may extend from the stator to a sealed terminal plug assembly (not shown) in electrical communication with the control module 24.

The third temperature sensor 90 may be in communication with the control module 24 and may be or include a thermocouple, a PTC (positive temperature coefficient) thermistor, an NTC (negative temperature coefficient) thermistor and/or a heat pulse sensor, for example, and/or any other temperature-sensing device. As will be subsequently described, the control module 24 may be operable to determine whether the lubricant level 44 in the lubricant sump 42 is below the first vertical height H1 based on data received from the third temperature sensor 90.

The pressure sensor 23 may be operable to measure a pressure of working fluid in the suction chamber 32. The pressure sensor 23 may be mounted to any suitable structure within the shell assembly 12 and may be fixed relative to the shell assembly 12 in a position so that the pressure sensor 23 is disposed above the predetermined maximum expected lubricant level. While the pressure sensor 23 is shown in FIG. 1A as being below the second vertical height H2, in some embodiments, the pressure sensor 23 could be at or above the vertical height H2. For example, the pressure sensor 23 could be mounted to the upper bearing housing or the shell 28. In some embodiments, the pressure sensor 23 could extend through the shell 28, as shown in FIG. 1A. In some embodiments, the pressure sensor 23 could be disposed in a suction line (not shown) that fluidly couples the suction fitting 38 with a heat exchanger (e.g., an evaporator) of the climate control system in which the compressor 10 is installed. In some embodiments, the pressure sensor 23 may be mounted at or below the predetermined maximum expected lubricant level.

The pressure sensor 23 may be in communication with the control module 24 and may be or include a force-collector type pressure sensor (e.g., a sensor having a diaphragm, piston, bourdon tube or bellow to measure strain or deflection over an area), a resonant type pressure sensor (sensing changes in resonant frequency to measure changes in fluid density), and/or a thermal type pressure sensor (sensing changes in thermal conductivity of a fluid), for example, and/or any other pressure-sensing device. As will be subsequently described, the control module 24 may be operable to determine whether the lubricant level 44 in the lubricant sump 42 is below the first vertical height H1 based on data received from the pressure sensor 23.

As described above, the control module 24 may be in communication with the first, second, and third temperature sensors 46, 86, 90, the pressure sensor 23, and the crankcase heater 45. The control module 24 may also be in communication with and control operation of the motor 14 and/or other components of the compressor 10 and/or the climate control system.

As will be described in more detail below, the control module 24, the first, second, and/or third temperature sensors 46, 86, 90, the pressure sensor 23, and the crankcase heater 45, including the configuration and placement thereof, can help provide accurate and cost-effective monitoring of the quantity of lubricant within the compressor 10.

Figure 1B:
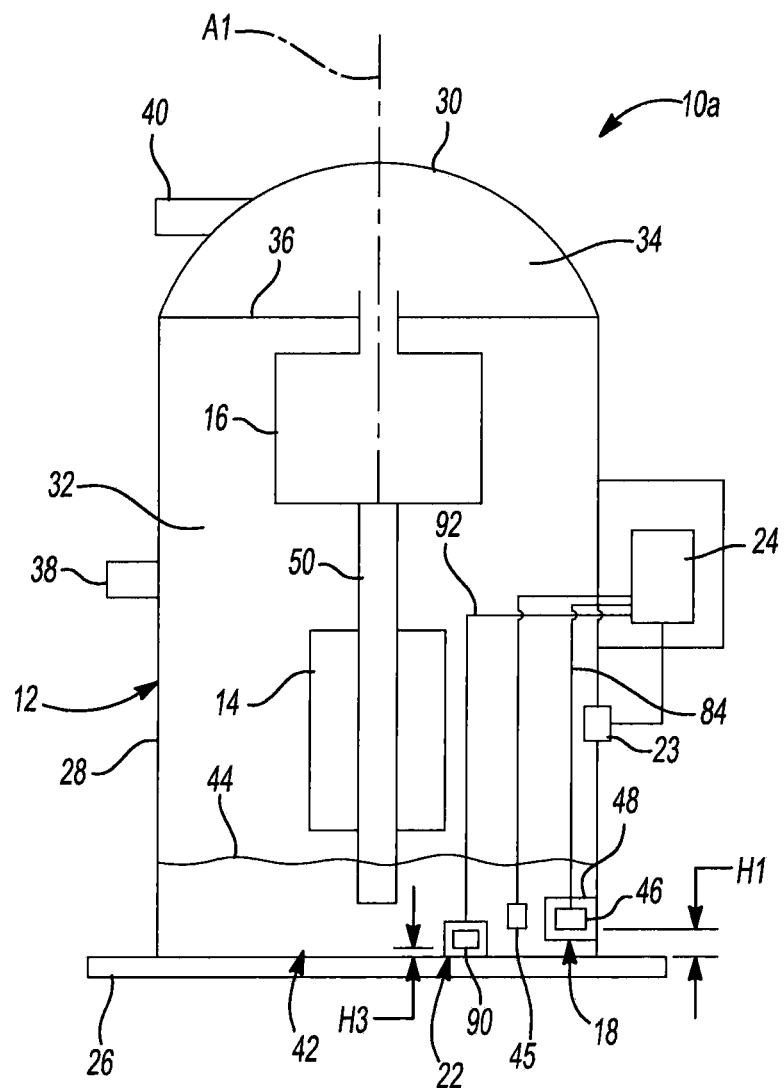
FIG. 1B is a schematic representation of another compressor having lubricant-level sensing system according to the principles of the present disclosure.

With reference to FIG. 1B, another compressor 10a is illustrated. The compressor 10a is generally similar to the compressor 10, except as otherwise provided herein. The compressor 10a includes the first and third temperature sensor assemblies 18, 22. In this regard, the compressor 10a does not include the second temperature sensor assembly 20.

Figure 2:
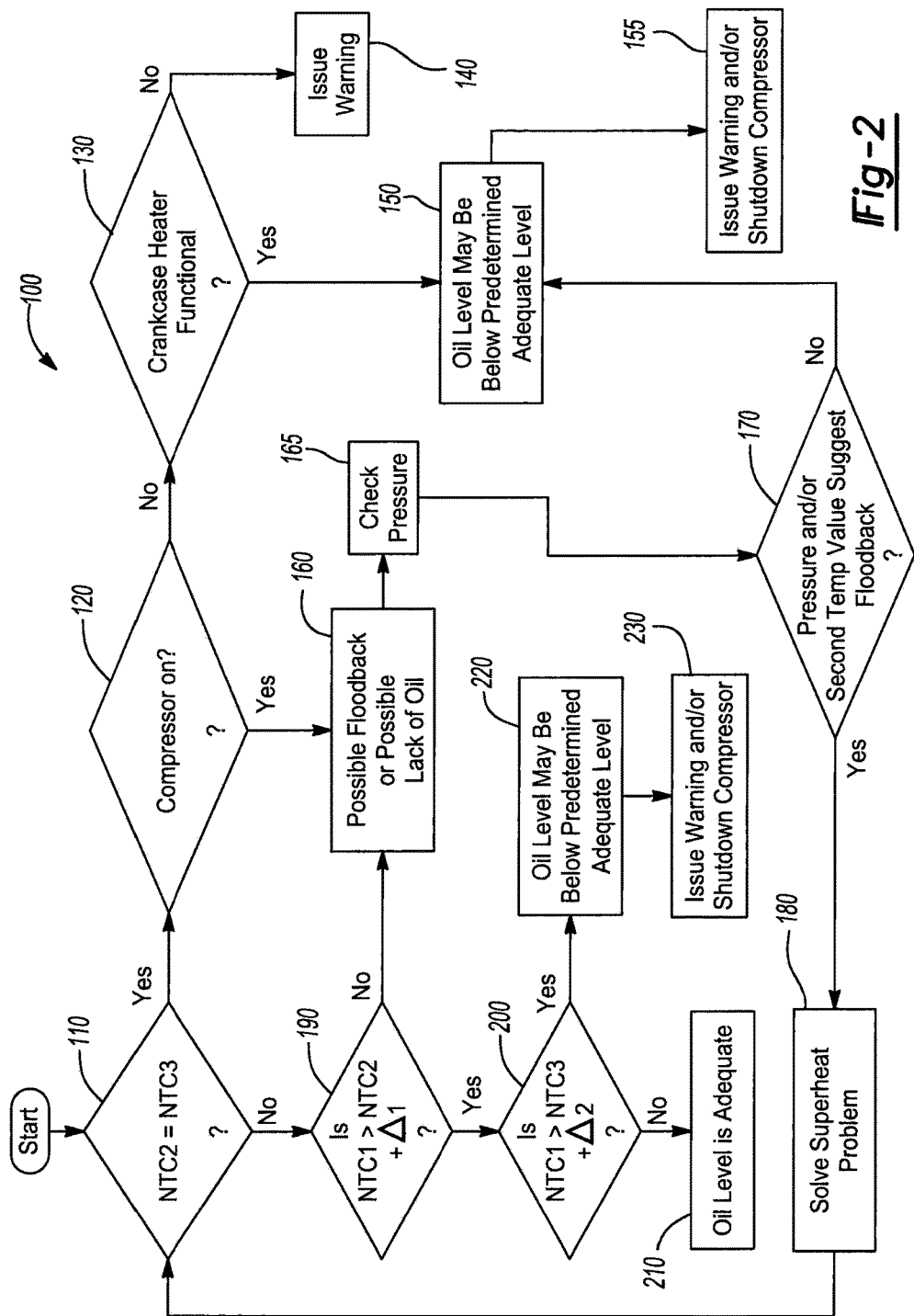
FIG. 2 is a flowchart illustrating a method for operating the lubricant-level sensing system of FIGS. 1A and/or 1B.

Referring now to FIG. 2, a method 100 will be described in which the control module 24 may determine whether the lubricant level 44 is below the first predetermined lubricant level based on information from the first temperature sensor 46, the second temperature sensor 86, the third temperature sensor 90, and/or the pressure sensor 23. For example, in some configurations, the control module 24 may determine whether the lubricant level 44 is below the first vertical height H1 based on information from the first temperature sensor 46, the second temperature sensor 86, the third temperature sensor 90, and/or the pressure sensor 23. In other configurations, the control module 24 may determine whether the lubricant level 44 is below the first vertical height H1 based on information from the first temperature sensor 46, the third temperature sensor 90, and/or the pressure sensor 23. The sensors 46, 86, 90, 23 may continuously or intermittently communicate temperature and pressure data to the control module 24, and the control module 24 may continuously or intermittently determine whether the lubricant level 44 is below the first vertical height H1 based on such data.

As previously discussed, in some compressors, the lubricant level 44 in the lubricant sump 42 may be considered to be adequate if the lubricant level 44 is vertically at or above the first vertical height H1 (that is, the first vertical height H1 may be selected to correspond to a chosen minimum level or height of lubricant for a particular compressor and/or application). Therefore, when the lubricant level 44 is above the first temperature sensor 46, the first temperature sensor 46 will be measuring a temperature of the lubricant in the lubricant sump 42. When the lubricant level 44 is below an adequate level (i.e., below the first vertical height H1), the first temperature sensor 46 will be exposed to working fluid in the suction chamber 32. Accordingly, the first temperature sensor 46 will measure the temperature of working fluid in the suction chamber 32 when the lubricant level 44 is below an adequate level. In some scenarios, notwithstanding the fact that the first temperature sensor 46 may be above the lubricant level 44, the first temperature sensor 46 may be exposed to the lubricant through splashing or other similar effects caused by movement of the compressor 10. Accordingly, in some scenarios the first temperature sensor 46 may measure a temperature of the lubricant even when the first temperature sensor 46 is above the lubricant level 44.

During normal operation of the compressor 10, the temperature of the lubricant in the lubricant sump 42 may be greater than the temperature of the working fluid in the suction chamber 32. When the compressor 10 is not operating or is in a standby mode, the crankcase heater 45 may maintain the lubricant at a temperature that is above the temperature of the working fluid in the suction chamber 32.

The control module 24 may compare a temperature value NTC3 measured by the third temperature sensor 90 to a temperature value NTC2 measured by the second temperature sensor 86. If the temperature value NTC3 measure by the third temperature sensor 90 is not greater than the temperature value NTC2 measured by the second temperature sensor 86, then one of a plurality of conditions may be present. A first one of the plurality of conditions may be that the compressor 10 is not operating (e.g., the compressor is turned off). A second one of the plurality of conditions may be that the compressor 10 is operating under a flood-back condition, whereby a mixture of liquid and vapor working fluid is drawn into the suction chamber 32 (e.g., as may occur when the climate control system is switching between heating and cooling modes or switching into or out of a defrost mode). A third one of the plurality of conditions may be that the lubricant level 44 is below the predetermined adequate level. Using the method 100, the control module 24 may determine which of the plurality of conditions is present and whether the lubricant level 44 is below the predetermined adequate level.

If the temperature value NTC3 measured by the third temperature sensor 90 is greater than the temperature value NTC2 measured by the second temperature sensor 86, then one of a further plurality of conditions may be present. A first one of the further plurality of conditions may be that the lubricant level 44 is at or above the first predetermined lubricant level (e.g., H1). A second one of the further plurality of conditions may be that the lubricant level 44 is below the first predetermined lubricant level (e.g., H1) and the first temperature sensor 46 is being exposed to other high temperature sources, such as lubricant sloshing or splashing, as described above.

At 110 of the method 100, the control module 24 may determine whether the temperature value NTC3 measured by the third temperature sensor 90 is equal to the temperature value NTC2 measure by the second temperature sensor 86. If the temperature value NTC3 is equal to or approximately equal to the temperature value NTC2, the control module 24 may determine at 120 if the compressor 10 is operating. As described above, the control module 24 may control operation of the motor 14, and therefore, the control module 24 may determine whether the motor 14 is operating based on control feedback and/or whether the motor 14 is receiving electrical current. If the control module 24 determines at 120 that the compressor 10 is not operating, the control module 24 may determine at 130 whether the crankcase heater 45 is operating or whether it is functional (e.g., by determining if the crankcase heater 45 is receiving electrical current). If the control module 24 determines that the crankcase heater 45 is not functional or is not operating, the control module 24 may generate a warning at 140 indicating a fault with the crankcase heater 45. The warning may be in the form of an audible and/or visual alarm on the compressor 10 and/or a warning or fault signal sent to a remote protection, control and/or diagnostic system for the compressor 10 and/or the climate control system, for example. The warning generated at 140 may also advise a person to visually check the lubricant level 44 (e.g., through a lubricant level sight glass).

If, at 130, the control module 24 determines that the crankcase heater 45 is operating correctly and the crankcase heater 45 has been operating for at least a predetermined time period (e.g., a long enough time to allow the crankcase heater 45 to warm the lubricant within the lubricant sump 42), the control module 24 may determine that the lubricant level 44 is below the predetermined adequate level at 150.

At 155 the control module 24 may then generate a warning and/or shutdown the compressor 10. The warning may be in the form of an audible and/or visual alarm on the compressor 10 and/or a warning or fault signal sent to a remote protection, control and/or diagnostic system for the compressor 10 and/or the climate control system, for example. The warning at 155 may also advise a person to add lubricant and/or perform service on the compressor 10 and/or the climate control system.

If, at 120, the control module 24 determines that the compressor 10 is operating, the control module 24 may determine at 160 that the compressor 10 is operating under a flood-back condition and/or the lubricant level 44 is below the predetermined adequate level. At 165 the control module 24 may acquire pressure data from the pressure sensor 23. At 170 the control module 24 may determine whether data from the pressure sensor 23 and/or data from the second temperature sensor 86 indicate a liquid flood-back condition by comparing the measured values with predetermined ranges of values that are known to indicate a flood-back condition for a particular compressor, refrigerant, refrigerant blend and/or climate control system. If the data from the pressure sensor 23 and/or data from the second temperature sensor 86 do not indicate a liquid flood-back condition, the control module 24 may determine at 150 that the lubricant level 44 is below the predetermined adequate level. Then, at 155 the control module 24 may generate the warning described above and/or shutdown the compressor 10. If the data from the pressure sensor 23 and/or data from the second temperature sensor 86 indicate a liquid flood-back condition at 170, the control module 24 may, at 180, take steps to alleviate or correct the flood-back condition. The steps to alleviate or correct the flood-back condition could include changing a control setting for the compressor 10 (e.g., changing a capacity of the compressor) and/or a control setting for the climate control system (e.g., changing condenser fan and/or evaporator fan speeds, changing timing, amount and/or duration that an expansion valve is open or closed). After 180, the control module 24 may loop back to 110.

If, at 110, the control module 24 determines that the temperature value NTC3 is not equal to the temperature value NTC2, the control module 24 may, at 190, determine if a temperature value NTC1 measured by the first temperature sensor 46 is greater than the temperature value NTC2 by more than a first predetermined difference $\Delta 1$. In some embodiments, the first predetermined difference $\Delta 1$ may be about ten degrees Fahrenheit, for example. The first predetermined difference $\Delta 1$ can be any value chosen to suit a particular compressor, refrigerant, refrigerant blend and/or application. If the control module 24 determines at 190 that the temperature value NTC1 is not greater than the sum of the temperature value NTC2 and the first predetermined difference $\Delta 1$, then the control module 24 may repeat steps 160, 170, 150 and 155, as described above, or repeat steps 160, 170 and 180, as described above.

If, at 190, the control module 24 determines that the temperature value NTC1 is greater than the sum of the temperature value NTC2 and the first predetermined difference $\Delta 1$, then the control module 24 may, at 200, determine whether the temperature value NTC1 is greater than the temperature value NTC3 by more than a second predetermined difference $\Delta 2$. In some embodiments, the second predetermined difference $\Delta 2$ may be about five degrees Fahrenheit, for example. The second predetermined difference $\Delta 2$ can be any value chosen to suit a particular compressor, refrigerant, refrigerant blend and/or application. As discussed above, in some configurations, the compressor 10a may include the first and third temperature sensors 46, 90. Accordingly, in some configurations the method 100 may begin at 200.

If the control module 24 determines at 200 that the temperature value NTC1 is not greater than the sum of the temperature value NTC3 and the second predetermined difference Δ2, then the control module 24 may determine at 210 that the lubricant level 44 is at or above the predetermined adequate level (i.e., at or above the first vertical height H1). If the control module 24 determines at 200 that the temperature value NTC1 is greater than the sum of the temperature value NTC3 and the second predetermined difference Δ2, then the control module 24 may determine at 220 that the lubricant level 44 is below the predetermined adequate level (i.e., below the first vertical height H1). At 230 the control module 24 may then generate a warning and/or shutdown the compressor 10. The warning may be in the form of an audible and/or visual alarm on the compressor 10 and/or a warning or fault signal sent to a remote protection, control and/or diagnostic system for the compressor 10 and/or the climate control system, for example. The warning at 230 may also advise a person to add lubricant and/or perform service on the compressor 10 and/or the climate control system.

Figure 3A:
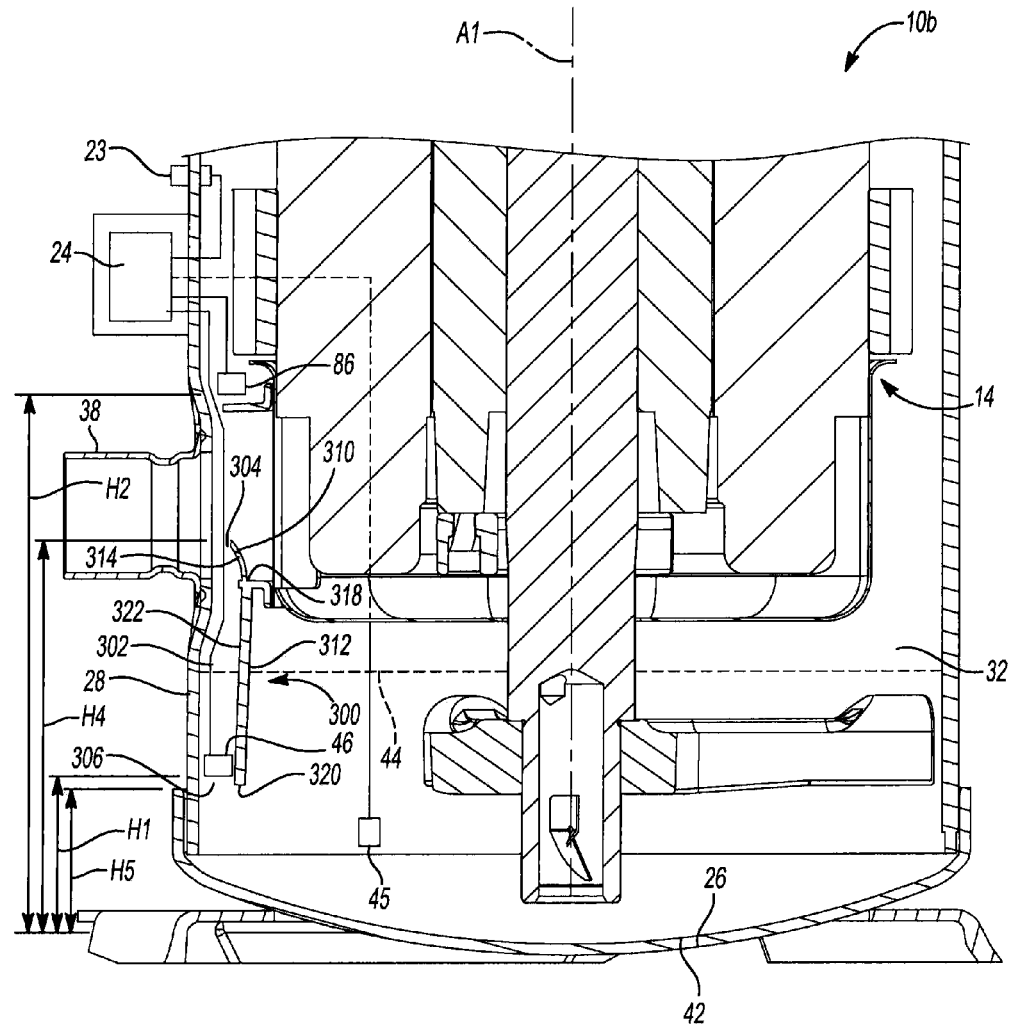
FIG. 3A is a partial cross-sectional view of another compressor having a lubricant-level sensing system according to the principles of the present disclosure, and illustrating a first lubricant level.
Figure 3B:
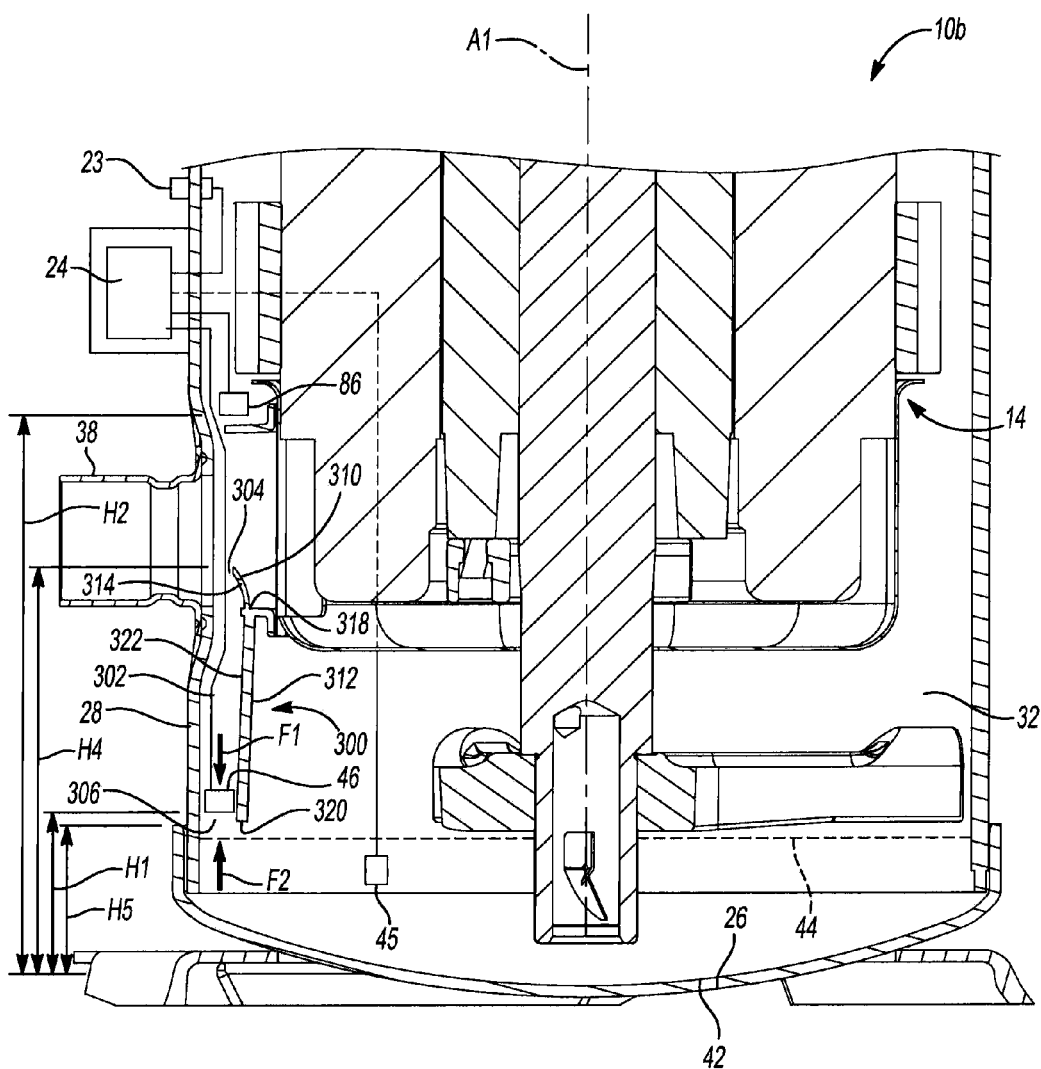
FIG. 3B is a partial cross-sectional view of the compressor of FIG. 3A, and illustrating a second lubricant level.

With reference to FIGS. 3A and 3B, a portion of another compressor 10b is provided. The structure and function of the compressor 10b may be similar or identical to that of the compressor 10 apart from any exceptions described below and/or shown in the Figures. Therefore, the structure and/or function of similar features will not be described again in detail.

The compressor 10b may include a working fluid guide assembly 300. The working fluid guide assembly 300 may define a fluid flow path 302 in the suction chamber 32. In some configurations the shell 28 and the working fluid guide assembly 300 may define the fluid flow path 302 therebetween. The fluid flow path 302 may include an inlet 304 and an outlet 306. As will be explained in more detail below, the inlet 304 may be in fluid communication with, and receive suction gas from, the suction port 38. As illustrated, the first temperature sensor 46 may be adjacent the outlet 306. In some configurations, the first temperature sensor 46 may be disposed within the fluid flow path 302. Specifically, the first temperature sensor 46 may be disposed between the shell 28 and the working fluid guide assembly 300 in a radially extending direction. Accordingly, in some configurations, the first temperature sensor 46 may be arranged to detect a temperature of suction gas received from the suction port 38 and the fluid flow path 302, as will be explained in more detail below. The second temperature sensor 86 may be disposed at the second vertical height H2. In this regard, the second temperature sensor 86 is exposed to suction gas received from the suction port 38. In particular, in some configurations, the second vertical height H2 may substantially equal a vertical height of the suction port 38.

The inlet 304 of the working fluid guide assembly 300 may be disposed at a fourth vertical height H4 above the base 26, and the outlet 306 of the working fluid guide assembly 300 may be disposed at a fifth vertical height H5 above the base 26. The fifth vertical height H5 may be lower than the fourth vertical height H4. The fourth vertical height H4 may be such that the inlet 304 is aligned or otherwise in fluid communication with the suction port 38. The fifth vertical height H5 may be such that the outlet 306 is aligned with, or slightly less than, the first vertical height H1 of the first temperature sensor 46. In this regard, the fifth vertical height H5 may correspond to the height of the lubricant level 44 when a predetermined threshold or minimum acceptable level of lubricant is present in the lubricant sump 42.

As illustrated in FIG. 3A, the working fluid guide assembly 300 may include a deflector 310 and a baffle 312. The deflector 310 and/or the baffle 312 may define, at least in part, the fluid flow path 302. In this regard, while the working fluid guide assembly 300 is described and illustrated herein as including the deflector 310 and/or the baffle 312, it will be appreciated that, in some configurations, the working fluid guide assembly 300 may include a tube or conduit (not shown) defining the fluid flow path 302.

The deflector 310 may be aligned with the inlet 304 and may include a deflection surface 314 having an arcuate shape facing the suction port 38. In this regard, the deflection surface 314 may define a concave configuration in a direction extending along the axis A1 of the shell 28, and a convex configuration in a direction extending about the axis A1 of the shell 28. Accordingly, the deflection surface 314 is configured to direct a portion of the working fluid from the suction port 38 downward through the fluid flow path 302 and toward the lubricant sump 42. The deflector 310 may be secured to the compressor 10b in any suitable manner. For example, the deflector 310 could be mounted to the shell 28 and/or to the motor 14.

The baffle 312 may include a first or upper end 318 aligned with the deflector 310 and a second or lower end 320 aligned with, or otherwise defining, the outlet 306 of the fluid flow path 302. In some configurations, the baffle 312 may include a guiding surface 322 facing the shell 28. The guiding surface 322 may define an arcuate shape having a planar configuration in a direction extending along the axis A1 of the shell 28, and a convex configuration in a direction extending about the axis A1 of the shell 28. Accordingly, the guiding surface 322 is configured to direct a portion of the working fluid from the deflector 310 downward through the fluid flow path 302 toward the lubricant sump 42. The baffle 312 may be secured to the compressor 10b in any suitable manner. For example, the deflector 310 could be mounted to the shell 28, the deflector 310, and/or to the motor 14. In some configurations, the deflector 310 may be integrally and/or monolithically formed with the baffle 312.

The fluid flow path 302, including the configuration of the working fluid guide assembly 300 and the placement of the first temperature sensor 46 relative to the fluid flow path 302, can help provide accurate and cost-effective monitoring of the quantity of lubricant within the compressor 10b. Specifically, with reference to FIG. 3A, during a first operating scenario the lubricant level 44 in the lubricant sump 42 may be higher or greater than the predetermined threshold or minimum acceptable level (e.g., H1) of lubricant. Accordingly, during the first operating scenario, the temperature value NTC1 measured by the first temperature sensor 46 may correspond to a temperature of the lubricant in the lubricant sump 42.

With reference to FIG. 3B, during a second operating scenario the lubricant level 44 in the lubricant sump 42 may be lower or less than the predetermined threshold or minimum acceptable level of lubricant. Accordingly, during the second operating scenario, the temperature value NTC1 may correspond to a temperature of the working fluid in the suction chamber 32. In this regard, as the compressor 10b operates in the second scenario, the working fluid guide assembly 300 can direct the working fluid through the fluid flow path 302 and over the first temperature sensor 46, such that the first temperature sensor 46 senses a temperature of the working fluid. In this regard, the flow of working fluid through the fluid flow path 302 can also help to prevent the lubricant from contacting first temperature sensor 46. Specifically, a downward force F1 produced by the flow of working fluid through the fluid flow path 302 can offset an upward force F2 produced by sloshed or splashed portions of the lubricant, such that the splashed portions of the lubricant do no contact the first temperature sensor 46 when the compressor 10b is operating in the second scenario.

Figure 4A:
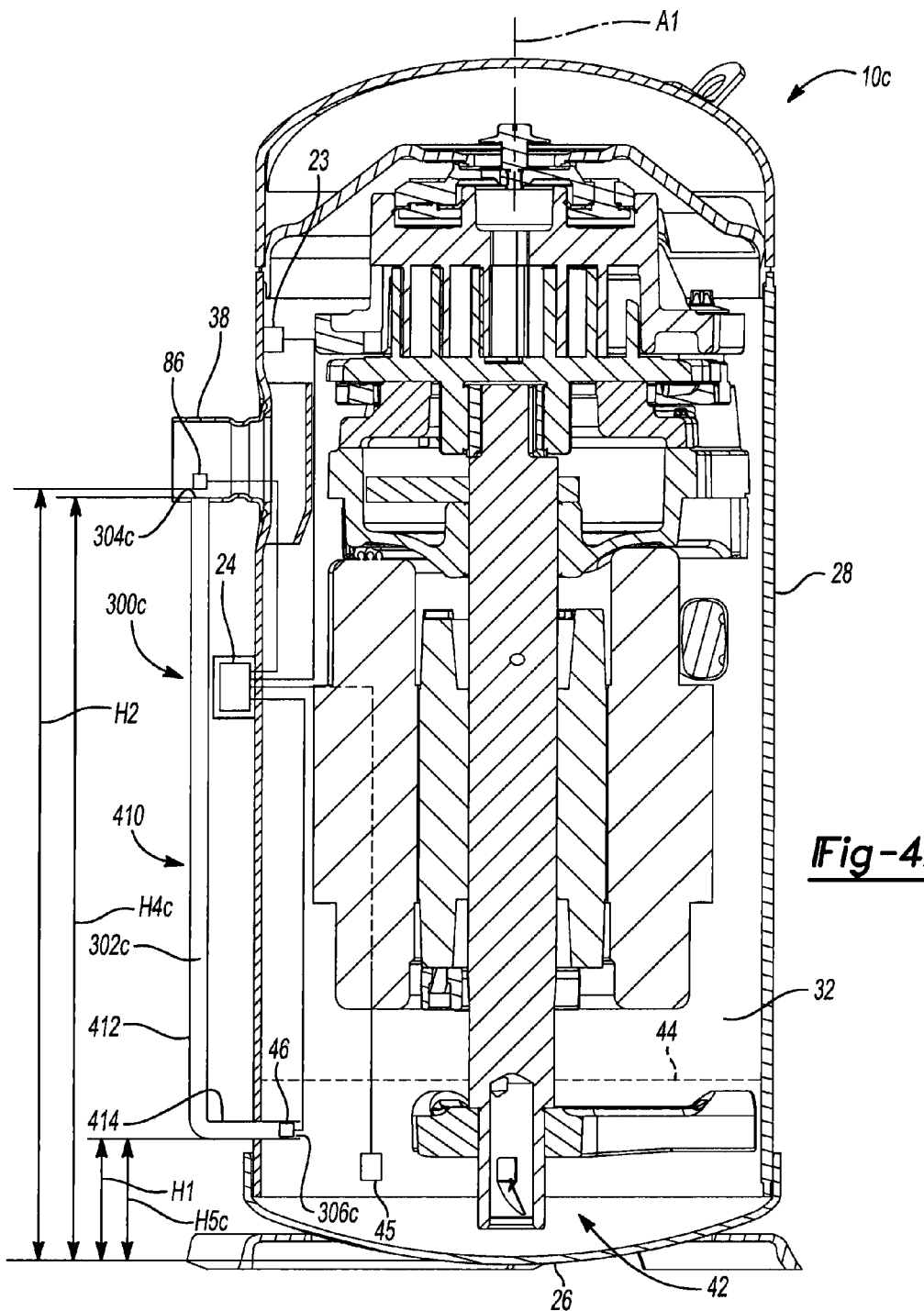
FIG. 4A is a partial cross-sectional view of yet another compressor having a lubricant-level sensing system according to the principles of the present disclosure, and illustrating a first lubricant level.
Figure 4B:
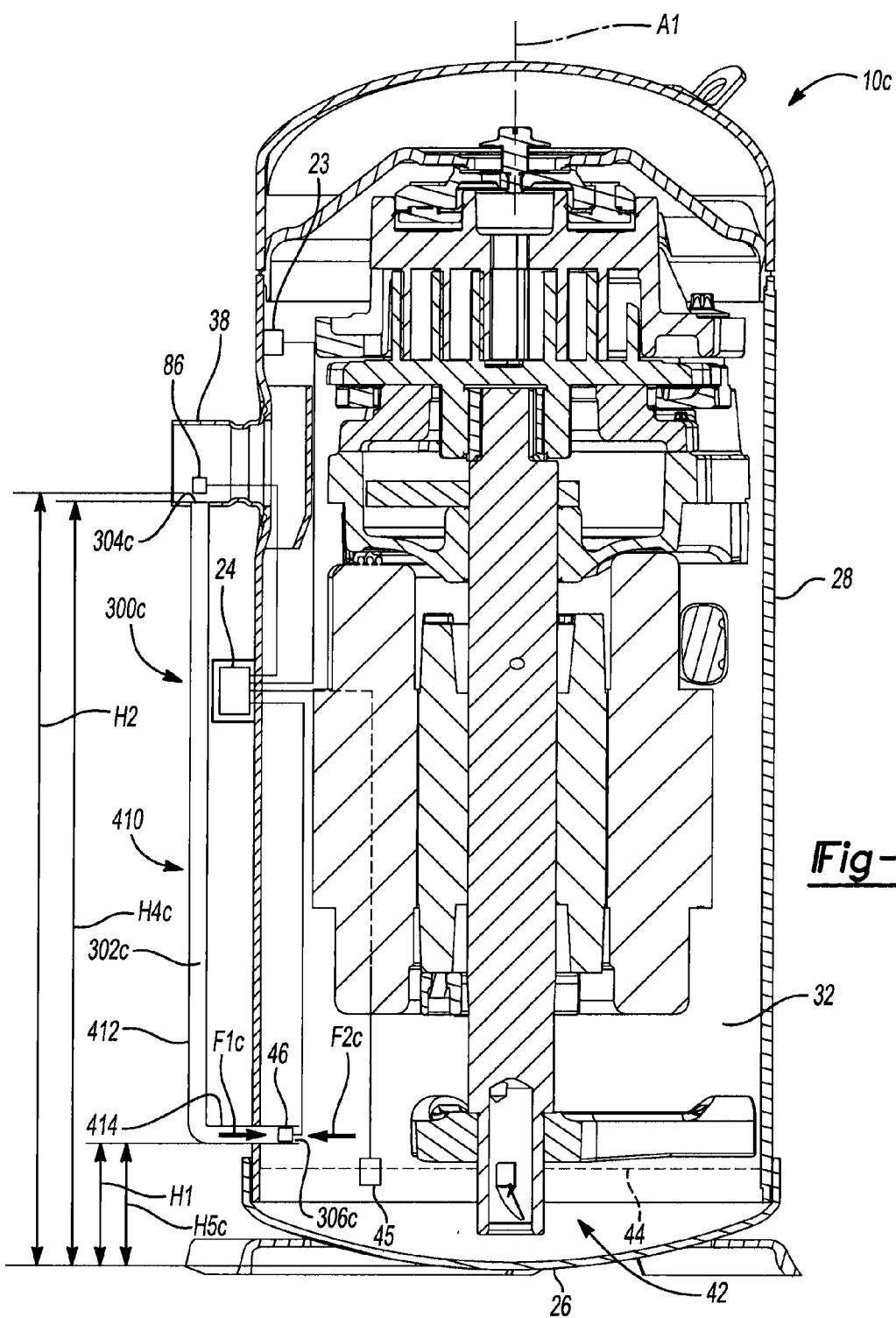
FIG. 4B is a partial cross-sectional view of the compressor of FIG. 4A, and illustrating a second lubricant level.

With reference to FIGS. 4A and 4B, another compressor 10c is provided. The structure and function of the compressor 10c may be similar or identical to that of the compressor 10b apart from any exceptions described below and/or shown in the Figures. Therefore, the structure and/or function of similar features will not be described again in detail. In addition, like reference numerals are used hereinafter and in the drawings to identify like components, while like reference numerals containing letter extensions (i.e., "c") are used to identify those components that have been modified.

The compressor 10c may include a working fluid guide assembly 300c defining a fluid flow path 302c. As illustrated, in some configurations at least a portion of the fluid flow path 302c may extend outside of the shell 28 and the suction chamber 32. It will be appreciated, however, that the fluid flow path 302c may extend inside the suction chamber 32 within the scope of the present disclosure. The fluid flow path 302c may include an inlet 304c and an outlet 306c. The inlet 304c may be disposed at a fourth vertical height H4c, and the outlet 306c may be disposed at a fifth vertical height H5c that is lower than the fourth vertical height H4c. The fourth vertical height H4c may be such that the inlet 304c is aligned, or otherwise in fluid communication, with the suction port 38. In this regard, as illustrated in FIG. 4A the inlet 304c may be in communication with the suction port 38 at a location outside of the shell 28. The fifth vertical height H5c may be such that the outlet 306c is aligned with the first vertical height H1 of the first temperature sensor 46. In this regard, the fifth vertical height H5c may correspond to the height of the lubricant level 44 when a predetermined threshold or minimum acceptable level of lubricant is present in the lubricant sump 42. As illustrated, the first temperature sensor 46 may be adjacent the outlet 306c. In some configurations, the first temperature sensor 46 may be disposed within the fluid flow path 302c.

As illustrated in FIG. 4A, the working fluid guide assembly 300c may include a tube or conduit 410 defining at least a portion of the fluid flow path 302c. The conduit 410 may include a vertically extending portion 412 and a horizontally extending portion 414. In this regard, the vertically extending portion 412 may extend in a direction substantially parallel to the axis A1 of the shell 28, and the horizontally extending portion 414 may extend in a direction substantially perpendicular to the axis A1 of the shell 28. The vertically extending portion 412 may include or otherwise define the inlet 304c, such that the vertically extending portion 412 is coupled to, or otherwise in fluid communication with, the suction port 38. The horizontally extending portion 414 may include or otherwise define the outlet 306c. As illustrated, in some configurations, the horizontally extending portion 414 may extend through the shell 28, such that the horizontally extending portion 414 is in fluid communication with the suction chamber 32. In some configurations, the first temperature sensor 46 may be disposed within the horizontally extending portion 414. The conduit 410, including the vertically and horizontally extending portions 412, 414, can direct a portion of the working fluid from the suction port 38 through the fluid flow path 302c and into communication with, or over, the first temperature sensor 46. The conduit 410 may be secured to the suction port 38 and/or the shell 28 in any suitable manner.

As will be described in more detail below, the fluid flow path 302c, including the configuration of the conduit 410 and the placement of the first temperature sensor 46 relative to the fluid flow path 302c and/or the conduit 410, can help provide accurate and cost-effective monitoring of the level and/or quantity of lubricant within the compressor 10c. Specifically, with reference to FIG. 4A, during a first operating scenario the lubricant level 44 in the lubricant sump 42 may be higher or greater than the predetermined threshold or minimum acceptable level of lubricant. Accordingly, during the first operating scenario, the temperature value NTC1 measured by the first temperature sensor 46 may correspond to a temperature of the lubricant in the lubricant sump 42.

With reference to FIG. 4B, during a second operating scenario the lubricant level 44 in the lubricant sump 42 may be lower or less than the predetermined threshold or minimum acceptable level of lubricant. Accordingly, during the second operating scenario, the temperature value NTC1 can correspond to a temperature of the working fluid in the suction chamber 32. In this regard, as the compressor 10c operates in the second scenario, the working fluid guide assembly 300c can direct the working fluid through the fluid flow path 302c and over the first temperature sensor 46. The flow of working fluid through the fluid flow path 302c can help to prevent the lubricant from contacting first temperature sensor 46. Specifically, a force F1c produced by the flow of working fluid through the fluid flow path 302c can offset a force F2c produced by the sloshed or splashed portions of the lubricant, such that the splashed portions of the lubricant do no contact the first temperature sensor 46 when the compressor 10c is operating in the second scenario.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

In this application, including the definitions below, the term 'module' may be replaced with the term 'circuit.' The term 'module' may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "for."

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, s, operations, elements, and/or components, but do not preclude the presence or addition of one or more other features, integers, s, operations, elements, components, and/or groups thereof. The method s, processes, and operations described herein are not to be construed as necessarily requiring their performance in the particular order discussed or illustrated, unless specifically identified as an order of performance. It is also to be understood that additional or alternative s may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A compressor comprising:
a shell including a motor, a compression mechanism, a lubricant sump, and a suction chamber;

a suction inlet extending through said shell and configured to deliver suction gas to the suction chamber;
a fluid path for delivering suction gas, the fluid path having a first end proximate said lubricant sump and a second end proximate said suction inlet;
a first temperature sensor disposed within said fluid path adjacent said first end;
a second temperature sensor disposed within said shell at a position vertically higher than said first sensor; and
a control module in communication with said first and second temperature sensors, said control module determining a temperature difference between said first temperature sensor and said second temperature sensor, said control module determining a liquid level in said lubricant sump based on said temperature difference.

2. The compressor of claim 1, further comprising a baffle, wherein said fluid path is at least partially defined by said baffle and said shell.

3. The compressor of claim 2, wherein said first temperature sensor is at least partially disposed between said baffle and said shell.

4. The compressor of claim 1, wherein said second temperature sensor is disposed vertically higher than said second end.

5. The compressor of claim 1, wherein said fluid path is disposed externally to said shell.

6. The compressor of claim 1, wherein said suction gas at said first and second ends of said fluid path is at a lower pressure than compressed discharge gas exiting said compression mechanism.

7. The compressor of claim 6, wherein working fluid is drawn into said compression mechanism for compression therein during operation of the compressor, and wherein said second temperature sensor is disposed within said suction chamber and measures a temperature of said working fluid disposed within said suction chamber.

8. The compressor of claim 6, wherein said first temperature sensor is exposed to a flow of said suction gas in a first mode of operation, and said first temperature sensor is exposed to a lubricant in a second mode of operation.

9. A compressor comprising:
a shell including a motor, a compression mechanism, a lubricant sump, and a suction chamber;
a suction inlet extending through said shell and configured to deliver suction gas to the suction chamber;
a fluid path for delivering suction gas, the fluid path having a first end proximate said lubricant sump and a second end proximate said suction inlet;
a first temperature sensor disposed within said fluid path adjacent said first end;
a second temperature sensor disposed within said shell at a position vertically higher than said first sensor; and
a control module in communication with said first and second temperature sensors, said control module determining a temperature difference between said first temperature sensor and said second temperature sensor, said control module determining a liquid level in said lubricant sump based on said temperature difference,
wherein working fluid is drawn into said compression mechanism for compression therein during operation of the compressor, and wherein said second temperature sensor is disposed within said suction chamber and measures a temperature of said working fluid disposed within said suction chamber.

10. The compressor of claim 9, wherein said liquid level is below said predetermined level when said liquid level is vertically below said first temperature sensor.

11. The compressor of claim 9, further comprising a baffle, wherein said fluid path is at least partially defined by said baffle and said shell.

12. The compressor of claim 11, wherein said first temperature sensor is at least partially disposed between said baffle and said shell.

13. The compressor of claim 9, wherein said second temperature sensor is disposed vertically higher than said second end.

14. The compressor of claim 9, wherein said fluid path is disposed externally to said shell.

15. A compressor comprising:
a shell including a motor, a compression mechanism, a lubricant sump, and a suction chamber;
a suction inlet extending through said shell and configured to deliver suction gas to the suction chamber;
a fluid path for delivering suction gas, the fluid path having a first end proximate said lubricant sump and a second end proximate said suction inlet;
a first temperature sensor disposed within said fluid path adjacent said first end;
a second temperature sensor disposed within said shell at a position vertically higher than said first sensor; and
a control module in communication with said first and second temperature sensors, said control module determining a temperature difference between said first temperature sensor and said second temperature sensor, said control module determining a liquid level in said lubricant sump based on said temperature difference,
wherein said first temperature sensor is exposed to a flow of said suction gas in a first mode of operation, and said first temperature sensor is exposed to a lubricant in a second mode of operation.

16. The compressor of claim 15, further comprising a baffle, wherein said fluid path is at least partially defined by said baffle and said shell.

17. The compressor of claim 16, wherein said first temperature sensor is at least partially disposed between said baffle and said shell.

18. The compressor of claim 15, wherein said second temperature sensor is disposed vertically higher than said second end.

19. The compressor of claim 15, wherein said fluid path is disposed externally to said shell.

* * * * *